UNITED STATES PATENT OFFICE.

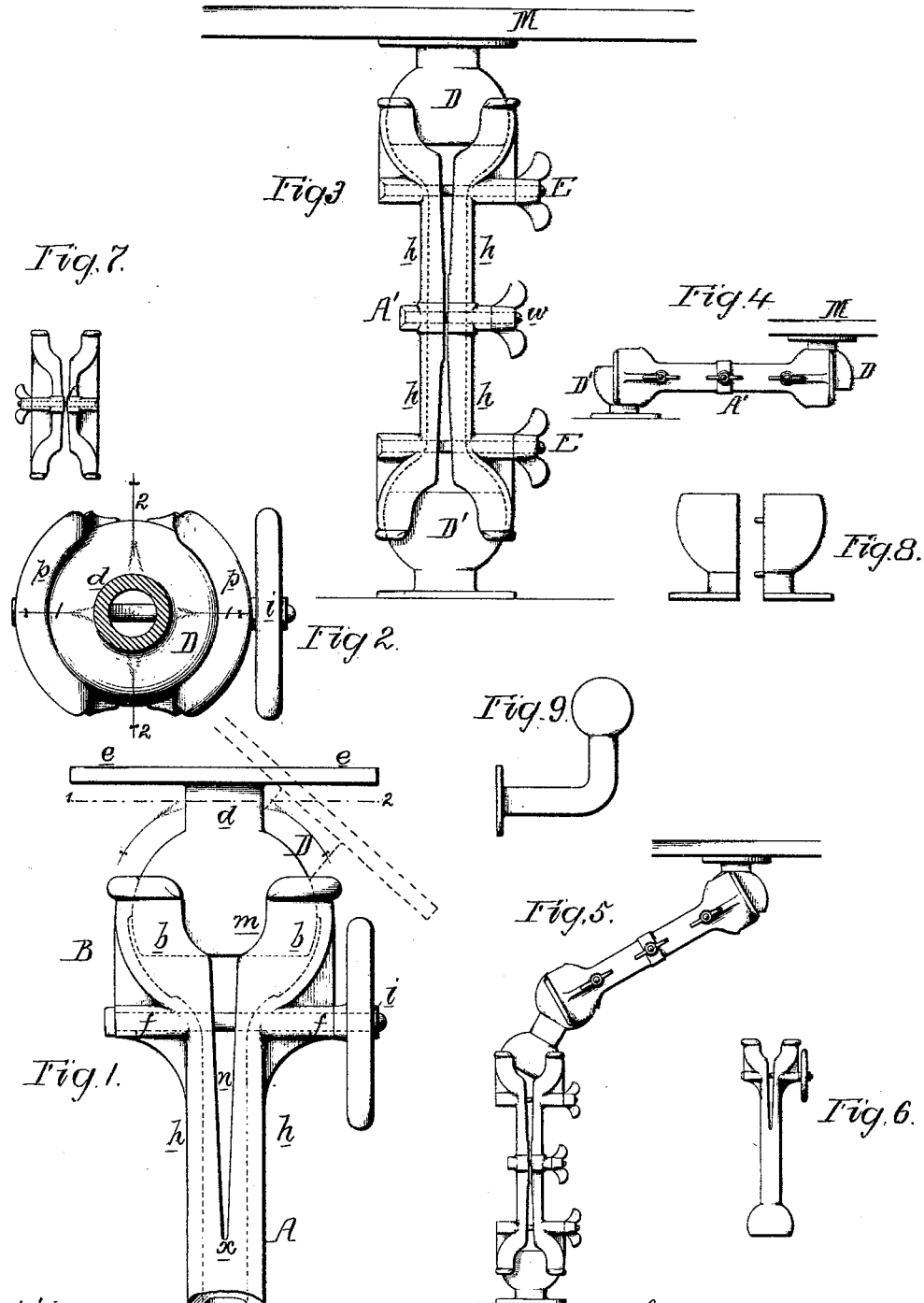

HENRY HOWSON, OF PHILADELPHIA, PENNSYLVANIA, ASSIGNOR TO THOMAS A. WESTON, OF SAME PLACE.

IMPROVEMENT IN BALL-AND-SOCKET SUPPORTS.

Specification forming part of Letters Patent No. 180,881, dated August 8, 1876; application filed July 17, 1876.

*To all whom it may concern:*

Be it known that I, H. HOWSON, of Philadelphia, Pennsylvania, have invented certain Improvements in Stands and Brackets with Ball-and-Socket Joints, of which the following is a specification:

The object of my invention is to make a cheap support, stand, or bracket with ball-and-socket joints, and to so construct the latter that increased capacity for the adjustment of the said support or bracket will be afforded.

In the accompanying drawing, Figure 1 represents an exterior view of my improved ball-and-socket joint for supports, brackets, &c.; Fig. 2, a sectional plan on the line 1 2; Fig. 3, a view of a stand or support with ball-and-socket joints at both ends; Fig. 4, the same, drawn to a reduced scale, and showing the capacity of the joint for adjustment; Fig. 5, a modification of Fig. 3; Fig. 6, a modification of part of Fig. 5; Fig. 7, a view showing a further modification of my invention, and Figs. 8 and 9, views showing different ways of making the ball.

In Fig. 1, A represents a portion of a cast-iron stand or support terminating at the top in and forming part of a socket, B, composed of two parts, $b\ b$, and adapted to the ball D, which has a stem, $d$, with a flange, $e$, for attachment to a drawing-board or other object, which it may be desirable to adjust to different positions.

The socket and upper portion are severed at $n$ down to a point, $x$, so that two slightly elastic or yielding arms, $h\ h$, are presented, and these arms, if the cast-iron be of proper quality, and the slot $n$ be deep enough, can be forced so far apart as to permit the ball to be introduced into the socket, the two arms, when released, recoiling, and the two portions of the socket embracing the ball—not too tightly, however, to prevent the ready adjustment of the ball in its socket.

In order to secure the socket firmly to the ball after the adjustment of the latter, I use a bolt, E, passing through projections $f\ f$ on the arms $h\ h$, the bolt being provided with a suitable nut, $i$, on tightening which the two parts of the socket will firmly gripe the ball.

Two opposite recesses, $m\ m$, are made in the socket, one on each side of the same, each recess being, in the present instance, a continuation of the slot $n$ in the stem A, and each recess being large enough to admit the stem $d$ of the ball.

While the adjustment of the ball, in either of the directions shown by the arrows 1 1, is so restricted by the edges $p\ p$ of the socket that the flange $e$ of the ball cannot be adjusted beyond a given inclination, the recesses $m$ in the socket will permit the ball to be adjusted in either of the directions indicated by the arrows 2 2, Fig. 2, to such an extent that the flange $e$ of the ball shall be in a vertical plane; for, as before remarked, the recesses $m\ m$ of the socket are large enough to admit the stem $d$ of the ball.

In Fig. 1, the stand is supposed to have but one ball-and-socket joint, and this at the top; but the lower end of this stand may, if desired, be constructed precisely in the same manner as the upper end, and adapted to a ball secured to the floor, or to a table or other object. When the stand or support, however, is to have a socket at each end, I prefer to make it in two parts, as shown in Fig. 3, these parts being preferably secured together in the middle by a bolt, screw, or rivet, $w$. In this case there are four slightly-elastic arms, $h$, two terminating at the upper socket, and two at the lower socket, which is adapted to a ball, D', secured to the floor or other object.

An example of the capacity of the stand A, Fig. 3, with its two ball-and-socket joints for adjustment, is shown in Fig. 4. The board M, secured to the upper ball D, cannot only be adjusted to any desired inclination, and to a vertical position, but can be lowered and moved laterally to any desired point in a circle having a radius equal to the distance between the centers of the two balls.

In Fig. 4, the stand has been depressed to a horizontal position, and forms a bracket for the support of the horizontal board, M.

One advantage of making the stand in two parts, is economy of construction, one pattern serving for both parts. The ball may also be cheaply made in two parts from one pattern, as shown in Fig. 8, the socket, with the screws which attach the flange to the board or other object, serving to secure the two parts together.

The stem A' has two bolts, E, one for each socket, but when a short stem is required, as in Fig. 7, a central bolt will suffice to secure the two parts together, and bind them to both balls.

An articulated stand may be made by connecting two or more stems together, as shown in Fig. 5, two balls united by one stem serving as a connection, or the upper stem having at its lower end a ball, Fig. 6, adapted to the socket at the upper end of the lower stand. This stem, Fig. 6, may be severed at the upper end, as in Fig. 1, or may be made in two parts.

The above-described stand may be applied to a variety of uses. It will, for instance, afford a very convenient adjustable support for drawing-boards; or can be used in the construction of artist's easels; or may be used for the support and adjustment of looking-glasses, for tables, brackets, and a variety of other objects.

The invention is especially applicable to adjustable reading and writing desks, and especially to such as are connected to chairs, in which case the lower ball should have a stem and flange, arranged as shown in Fig. 9, for attachment to the side of the chair.

Economy of construction, one of the main objects of my invention, has been attained by so designing the several parts that all can be made of cast-iron, (excepting the bolts,) from simple patterns, and by simple molding.

I claim as my invention—

1. The combination, in a ball-and-socket joint, of a recess or recesses, $m$, in the socket, with the stem $d$ of the ball, as set forth.

2. The combination of a ball, D, with a socket composed of two parts, $b\ b$, on arms $h\ h$, forming part of a stand, all substantially as specified.

3. The stand or support A', composed of two parts, united substantially as described, and having at each end a socket adapted to a ball, as set forth.

In testimony whereof I have signed my name to this specification in the presence of two subscribing witnesses.

HENRY HOWSON.

Witnesses:
 ISAAC C. KENNEDY,
 HUBERT HOWSON.